(12) United States Patent
Shaughnessy et al.

(10) Patent No.: US 7,015,911 B2
(45) Date of Patent: Mar. 21, 2006

(54) COMPUTER-IMPLEMENTED SYSTEM AND METHOD FOR REPORT GENERATION

(75) Inventors: Jeffrey Charles Shaughnessy, Durham, NC (US); David Jonathan Bailey, Morrisville, NC (US); Michael Stephen Whitcher, Apex, NC (US); Damantha Hiran Boteju, Copenhagen V. (DK)

(73) Assignee: SAS Institute Inc., Cary, NC (US)

( * ) Notice: Subject to any disclaimer, the term of this patent is extended or adjusted under 35 U.S.C. 154(b) by 492 days.

(21) Appl. No.: 10/403,991

(22) Filed: Mar. 31, 2003

(65) Prior Publication Data

US 2003/0212960 A1 Nov. 13, 2003

Related U.S. Application Data

(60) Provisional application No. 60/368,896, filed on Mar. 29, 2002.

(51) Int. Cl.
*G06T 11/00* (2006.01)

(52) U.S. Cl. ...................................................... 345/440
(58) Field of Classification Search ................. 345/440
See application file for complete search history.

(56) References Cited

U.S. PATENT DOCUMENTS

| | | | |
|---|---|---|---|
| 6,301,579 B1 | 10/2001 | Becker | |
| 6,614,433 B1 | 9/2003 | Watts | |
| 2002/0149604 A1 | 10/2002 | Wilkinson | |
| 2003/0030637 A1 | 2/2003 | Grinstein et al. | |
| 2003/0071814 A1 | 4/2003 | Jou et al. | |

OTHER PUBLICATIONS

Bissell et al., Modeling applications of spreadsheets, 1989, IEE review, pp. 267-271.*

* cited by examiner

*Primary Examiner*—Almis Jankus
(74) *Attorney, Agent, or Firm*—Jones Day

(57) ABSTRACT

A computer-implemented system and method for generating at least one report from a plurality of data sources. The system and method include a data source specification to indicate the data to be retrieved from the data sources so that the report may be generated based upon the extracted data. A view specification indicates how the data is to be visually represented within the report. A report rendering engine causes the data to be retrieved from the data sources in accordance with the data source specification, and creates in accordance with the view specification a visual representation of the report based upon the retrieved data.

57 Claims, 14 Drawing Sheets

```
<?xml version="z.0" ?>
<Report version="z.00" xmlns:style="http://www.example.com/ReportModel/style">

<!-Define Style Schemes to use within the report.>

<style:Scheme name="MyReportScheme">
  <style:Style name="Table"
    backgroundColor="White"
    borderColor="grey"
    font="Verdana"
    fontSize="12pt"
  />
  <style:Style name="TitleText"
    font="Verdana"
    fontSize="24pt"
  />
  <style:Style name="NormalText"
    font="Times"
    fontSize="10pt"
  />
</Scheme>
```

```
<!-Define the data to use>

<Data>
  <IQData name="SalesOLAPData" type="MD">
    <DataSelection>
      <Collections>
        <Collection name="YearlySales" path="/Sales/2002"/>
      </Collections>
      <DataItems>
        <DataItemRef name="Geography" />
        <DataItemRef name="Time" />
        <DataItemRef name="Sales" />
      </DataItems>
    </DataSelection>
  </IQData>

<IQData name="SalesRelationalTransactionData" type="2D">
    <DataSelection>
      <Collections>
        <Collection name="DailySales" path="/Sales/2002"/>
      </Collections>
      <DataItems>
        <DataItemRef name="Customer" />
        <DataItemRef name="Units" />
        <DataItemRef name="Cost" />
      </DataItems>
    </DataSelection>
  </IQData>
</Data>
```

```
<!-Define the visual representation, or View, to render>

<View style:Scheme="MyReportScheme">

<!- Title Section>

<Section name="Title section">
<Body>
<GriddedLayout />
<Text>
<Span style:Style="TitleText">Daily Sales Report</Span>
</Text>
</Body>
</Section>

<!-Section containing two tables (OLAP and Relational) side by side)>

<Section name="Table Section">
<Body>
<GriddedLayout columns="2" />
<Table data="SalesOLAPData "/>
<Table data="SalesRelationalTransactionData"/>
</Body>
</Section>

<!- Section containing a Graph created by analytical output processing>

<Section>
<Body>
<GriddedLayout />
<Process storedProcess="HistoricalalesGraph" data="SalesRelationalTransactionData" />
</Body>
</Section>

</View>
</Report>
```

COMPUTER-IMPLEMENTED SYSTEM AND METHOD FOR REPORT GENERATION

RELATED APPLICATION

This patent application claims benefit of and priority to U.S. provisional patent application Ser. No. 60/368,896 (filed Mar. 29, 2002 entitled "Computer-Implemented System and Method for Report Generation"), which is incorporated by reference herein.

FIELD OF THE INVENTION

The present invention relates generally to data collection and analysis systems and more particularly to report generation.

BACKGROUND AND SUMMARY

Companies are increasingly collecting and processing data from different sources. Generating reports from different sources consumes time and personnel resources. Typically, users had to first independently execute the different programs to generate all of the data needed in a report. This may include executing a relational database program to query the database and store the results in a particular format; and then executing other programs, such as an Online Analytical Processing (OLAP) program and/or statistical program and then storing their respective results in the programs' designated formats. Through graphical user interfaces, the users copy and paste all or portions of the programs' results in a document for use in a report. Additional difficulties arise when the underlying data changes and the process must be repeated anew.

The present invention overcomes the aforementioned disadvantages as well as others by providing a computer-implemented system and method for generating at least one report from a plurality of data sources. The system and method include a data source specification to indicate the data to be retrieved from the data sources so that the report may be generated based upon the extracted data. A view specification indicates how the data is to be visually represented within the report. A report rendering engine causes the data to be retrieved from the data sources in accordance with the data source specification, and creates in accordance with the view specification a visual representation of the report based upon the retrieved data.

BRIEF DESCRIPTION OF THE DRAWINGS

FIGS. 5A–5C are data structure diagrams depicting an exemplary report specification;

DETAILED DESCRIPTION

Figure 1:
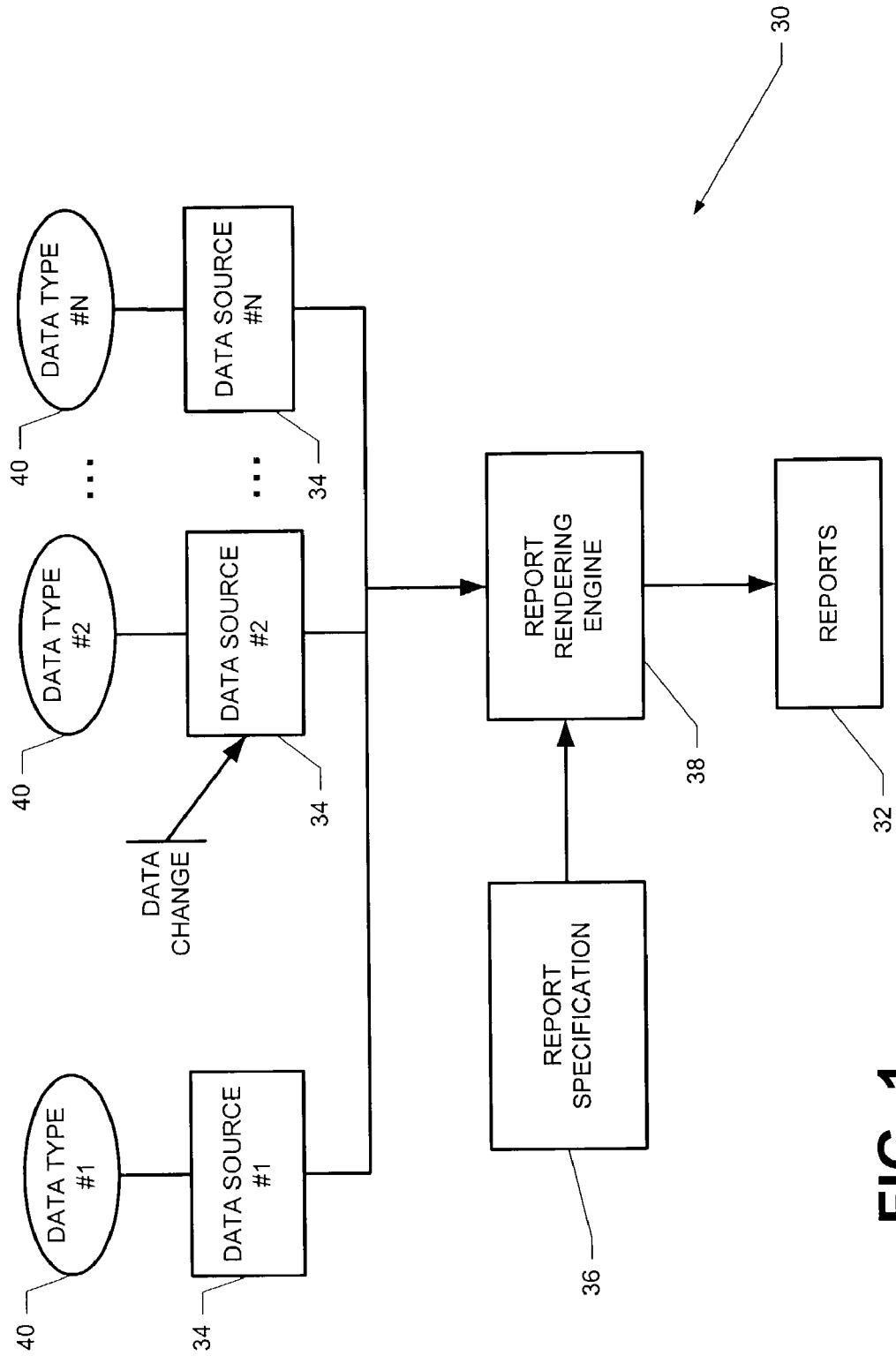
FIG. 1 is a block diagram depicting software and computer components utilized in rendering reports.

FIG. 1 depicts a computer-implemented system 30 that renders reports 32 based upon data from different data sources 34. A report specification 36 defines a template, or description, of how the data should look based on the state of the data when a report 32 is rendered. The rendered instances 32 change as their underlying data 34 changes. Thus a rendered report 32 may be created one time and will not have to be recreated every time the data 34 changes.

Based upon the report specification 36, a report rendering engine 38 integrates different types 40 of data from different sources 34. The report specification 36 may define how the different types of data should be represented visually in a report 32 regardless of whether the data source 34 is a Microsoft Access or Oracle database, or an OLAP system or a 4GL (generation language) statistical analysis language (such as 4GL SAS language from SAS Institute Inc.), a spreadsheet program, or a word processing program (and regardless of whether the data is in a Microsoft Word or Excel or relational format or OLAP format or other type of format).

Figure 2:
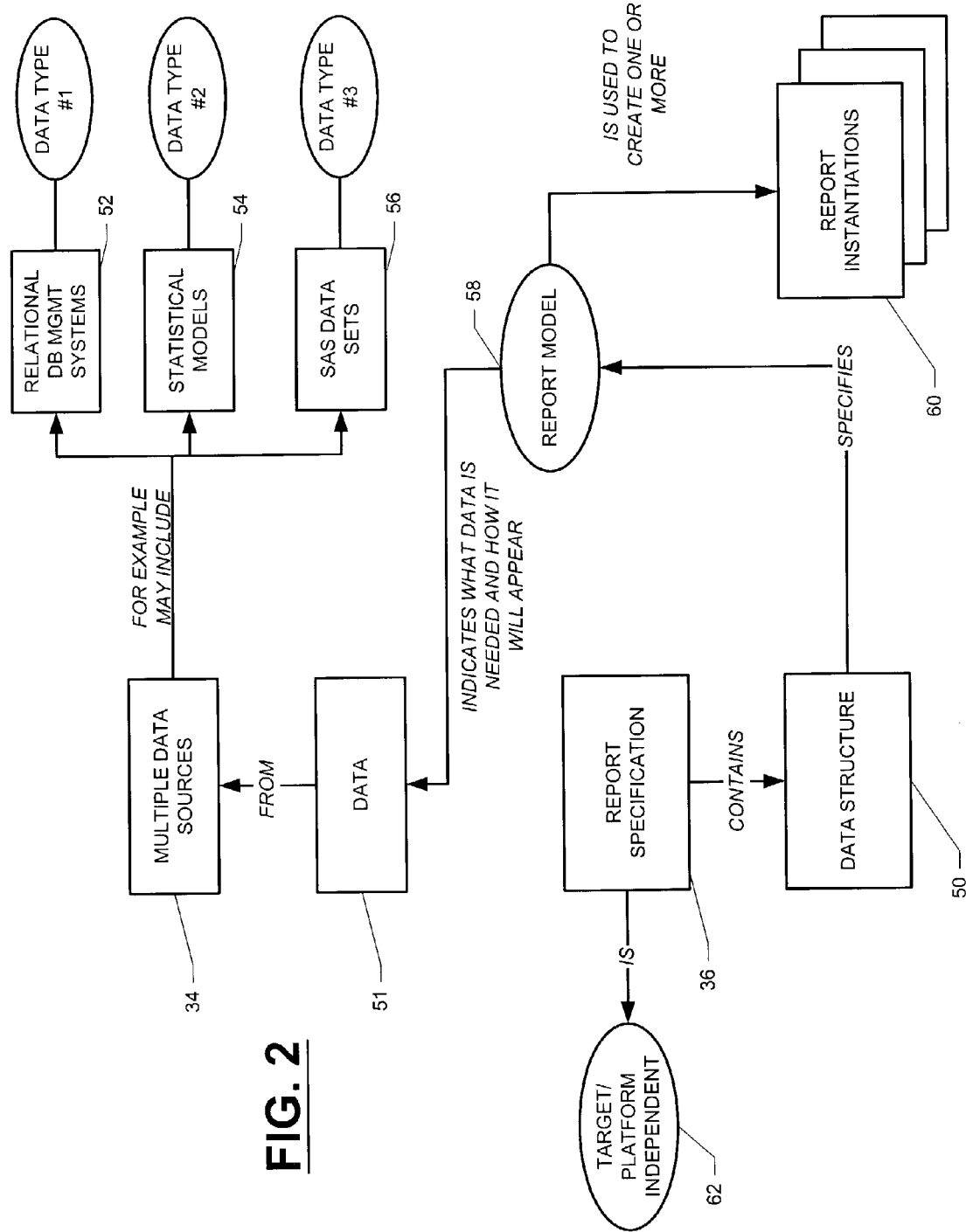
FIGS. 2 and 3 are block diagrams depicting a report specification for use in rendering reports.

FIG. 2 depicts a report specification 36 that is used in rendering reports. The report specification 36 contains a data structure 50 to dictate what data sources 34 are involved in creating a report 32 and how the data 51 should appear in the report. For example, the data structure 50 may specify that data 51 is to be collected from a relational database management system 52, statistical data models 54, and data sets 56 (such as those used within a statistical package, as in the package available from SAS Institute Inc. located in North Carolina).

The data structure 50 operates as a report model 58 from which one or more report instantiations 60 may be generated. If data 51 in one of the data sources (52, 54, 56) should change, the data model 58 automatically specifies where in a report instantiation 60 updates are needed. The data structure 50 may be a target and platform independent specification 62 while also allowing the report instantiations 60 to be rendered in many different formats. Thus, a report instantiation 60 may be generated in HTML, PDF, XML, RTF, WAP, and other formats.

Figure 3:
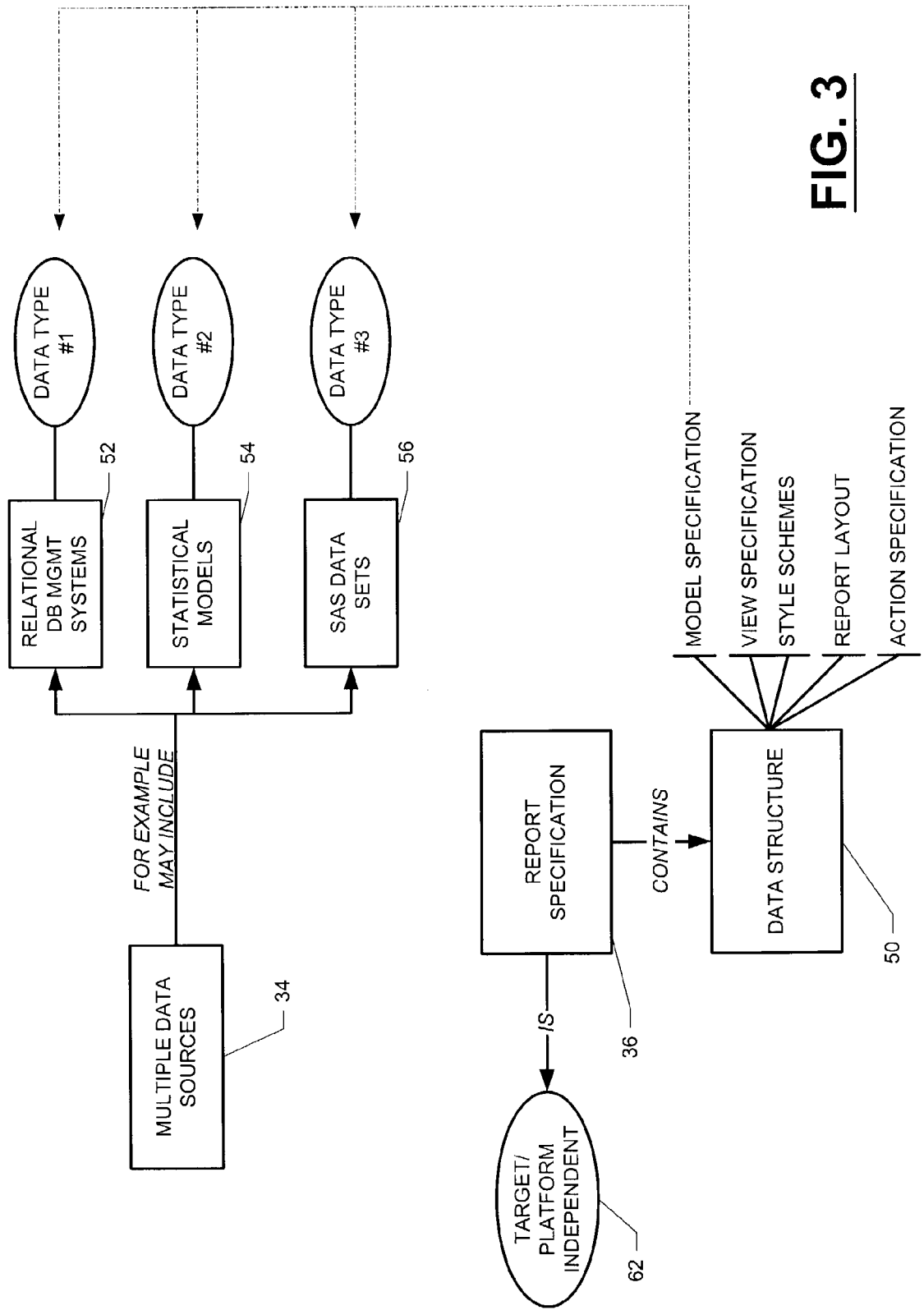

Details of the data structure 50 are discussed in reference to FIG. 3. The data structure 50 allows the specification of the data source, the required analysis on the data, and the visual representation of the data. To achieve these functions, the data structure 50 includes a models specification (also known as a data source specification). The models specification indicates what data is to be extracted and from what source. The sources include, but are not limited to: references to SAS datasets; OLAP cubes; relational databases; data in different XML formats; SAS datasets, procedures, and data steps; and stored processes.

To specify the visual representation of the data, the data structure 50 includes a view specification to allow a template specification of tables, graphs, maps, images, video, OLE objects and text. The view specification provides the template for the layout and visual representations of the data. The view specification may be used to render specific formats based upon the process requesting the report. This allows the same report to be rendered as HTML, PDF, XML and other formats.

In addition to models and views, the data structure 50 encompasses other features which are useful to render the report:

- A template specification of visual attributes (fonts, colors, line thickness, etc.) which are referred to as a style schemes specification.
- A template specification of a Table of Contents for the document.
- A template specification for PageHeaders, PageFooters, Background images and text, and Overlay images and text.
- A template specification for conditionally rendering sections and elements of the document based on data values.
- A template specification for conditionally rendering elements of the document based on the device or target being rendered for (e.g., PageHeaders are often desired when rendering for PDF (on paper) but not when rendering to HTML for display in a web browser).
- A template specification for actions to occur when a user clicks on elements in the document. These actions include, but are not limited to, invoking a related document, switching focus to a different part of the document for more detailed information, or drilling-down in the graph or table to get more detailed information.

Figure 4:
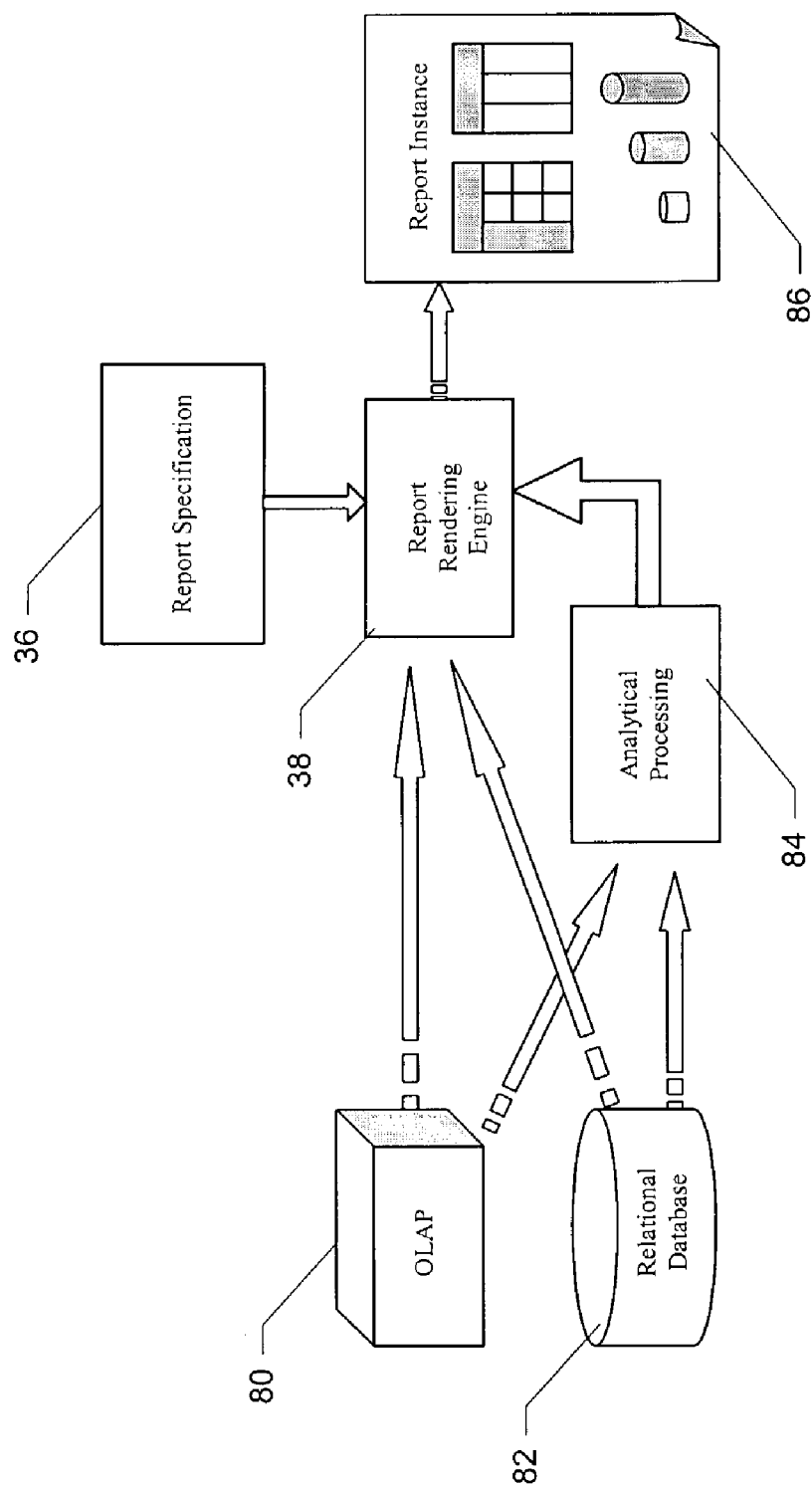
FIG. 4 is a block diagram depicting software and computer components utilized in rendering reports from OLAP and relational database sources.

FIG. 4 is an example where reports are rendered from OLAP 80 and relational database 82 sources. Data from the OLAP 80 and relational database 82 sources may be used directly by the report rendering engine 38, or analytical processing 84 may be performed first on the retrieved data and the results from the analytical processing 84 may also be used by the report rendering engine 38. Through the report specification 36, the report rendering engine 38 can combine OLAP 80, relational 82 and analytical 84 inputs into one report 84 having visual representations (e.g. tables, graphs, etc.) of all the inputs.

FIGS. 5A–5C show an example of a report specification's data structure at 100. This report specification's data structure 100 was used to create the report 200 shown in FIG. 6. The discussion of the example is with reference to FIGS. 5A–5C and 6.

The report specification's data structure 100 is shown in an XML format. The XML format permits tags to show how one data item relates to another data item, such as what data item is contained within another data item in the XML hierarchy. The highest level in the XML hierarchy is the Report tag. The different specifications needed to generate the report occupy the next level in the XML hierarchy. In this example, the style schemes specification, data models specification, and the view specification are used to generate the report of FIG. 6. It should be understood that many different hierarchies can be used to achieve the report generation functions.

The style scheme specification on FIG. 5A indicates the format for different report sections, such as the style for the tabular data to be displayed in the report, the style for the title text, and a style definition for what the normal text in the report should be.

The models specification shown in FIG. 5B indicates what data is to be retrieved and from what data sources. In this example, the models specification designates the heterogeneous data sources as an OLAP source and a relational source. From the OLAP source, geography data items, time data items, and sales data items are to be retrieved for use in the report. From the relational source, customer data items, units data items, and cost data items are to be retrieved for use in the report.

In this example, the view specification on FIG. 5C specifies for the report to be generated visual representations for a title section, a table section, and a section containing a graph. The view specification indicates that: the retrieved OLAP data is to be visually represented within the report as a table; the retrieved relational data is to be visually represented within the report as another table; and a historical sales graph is to be formed.

Figure 6:
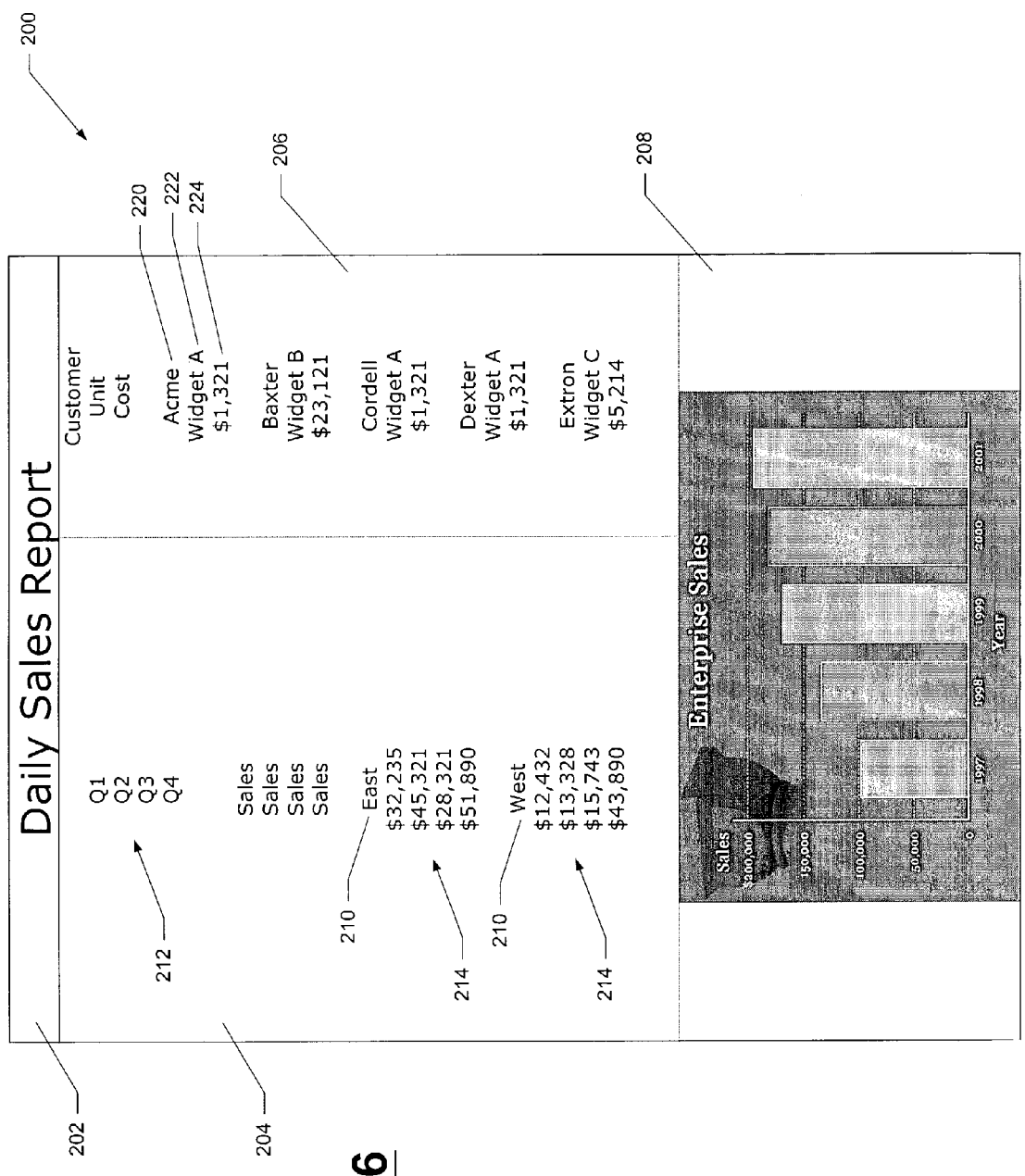
FIG. 6 is an exemplary output report generated via the report specification of FIGS. 5A–5C.

FIG. 6 shows the generated report 200 for this example based upon the report specification's data structure 100. The report 200 contains a title section 202, two table regions (204 and 206) of data as well as historical sales bar chart region 208 as specified by the data structure's view specification. The styles for the report 200 are in accordance with the style scheme "MyReportScheme" specified in the view XML tag on FIG. 5C (and as defined within the MyReportScheme XML tags on FIG. 5A).

The title section 202 in the report 200 is entitled "Daily Sales Report" (as specified by the title section XML tags on FIG. 5C). The title appears in the Verdana font type and with a font size of twelve points (due to the title being specified in the title section XML tags as adhering to the TitleText style that was defined by the style tags on FIG. 5A). The title appears in a grid within region 202 (as specified by the GriddedLayout tags within the title section XML tags).

Two column regions (204 and 206) in the report 200 have been created to hold the OLAP and relational data. The first column region 204 shows the retrieved OLAP data (i.e., geography data items 210, time data items 212, and sales data items 214 in accordance with the table section data XML tags on FIG. 5C). The second column region 206 shows the retrieved relational data (i.e., customer data items 220, units data items 222, and cost data items 224 in accordance with the table section data XML tags on FIG. 5C). The retrieved data is shown in two column regions (204 and 206) in the report 200 due to the table section XML tags indicating GriddedLayout columns="2" on FIG. 5C. The report 200 contains the historical sales graph in grid region 208 (as specified by the graph section XML tags on FIG. 5C).

Figure 7A:
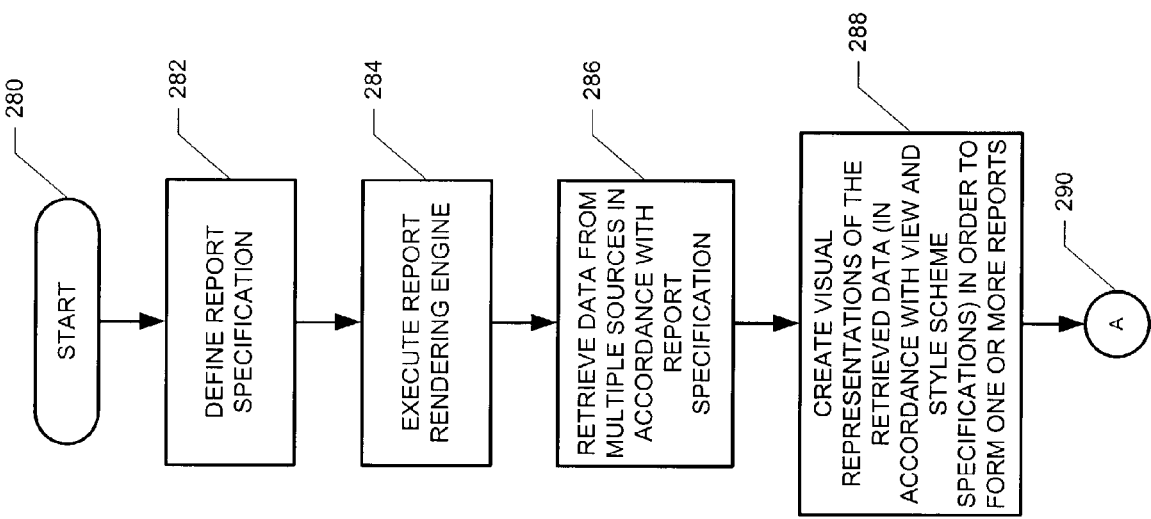
FIGS. 7A and 7B are flowcharts depicting steps used in generating a report.
Figure 7B:
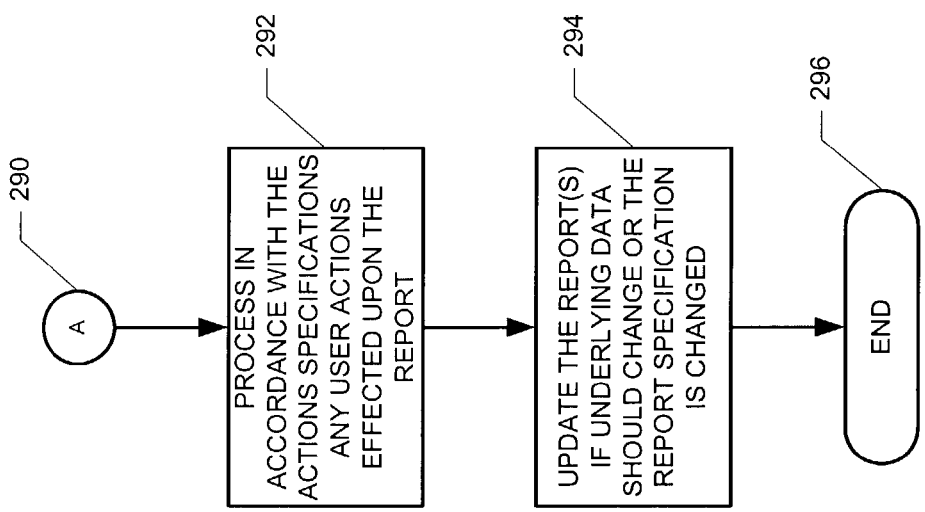

FIGS. 7A and 7B are flowcharts depicting steps used in generating reports based upon a report specification. With reference to FIG. 7A, start indication block 280 indicates that at process block 282, a report specification is created. To use the report specification, a report rendering engine is operated at process block 284. It is noted that the user may be prompted to change what data is retrieved at this phase or to select data that satisfies a user-supplied criteria, or a user can be prompted for a title of the report. The user can also be prompted for style preferences for the report. The prompted values can overwrite the values that are in the report specification or specify values not provided in the report specification.

At process block 286, data is retrieved from multiple sources as specified by the model specification in the report specification. It should be understood that data may be retrieved through many ways, such as through interaction with one or more of the multiple sources or through the data being retrieved by obtaining the file or data stream that contains the desired data or through invoking a another application to obtain the needed data or through invoking another application to prompt a user for the desired data.

In accordance with view and style scheme specifications (and any other relevant specification contained in the report specification), visual representations of the retrieved data are created and used to form one or more reports at process block 288. It should be understood that one or more of the different specifications within the report specification may be used. For example, a report specification may use model and view specifications without using a style scheme specification.

The specifications may perform many different functions. For example, the data source specification may describe calculations to create additional data items from a data source. As another illustration, the data source specification may describe the format of the data (not just the type) that is to be used when supplying the data to the view specification when rendering the report. Processing continues on FIG. 7B as indicated by continuation indicator 290.

With reference to FIG. 7B, process block 292 processes in accordance with the actions specifications any user actions effected upon the report. As an example, such actions may include the ability to add links (e.g., to Internet web sites, or to other reports, or to other sections within the report), drill downs, application invocations to elements (e.g., tables, graphs, text, images, etc.) in the report. Process block 294 updates the generated report(s) if underlying data changes or the report specification is changed. The steps end at block 296.

Figure 8:
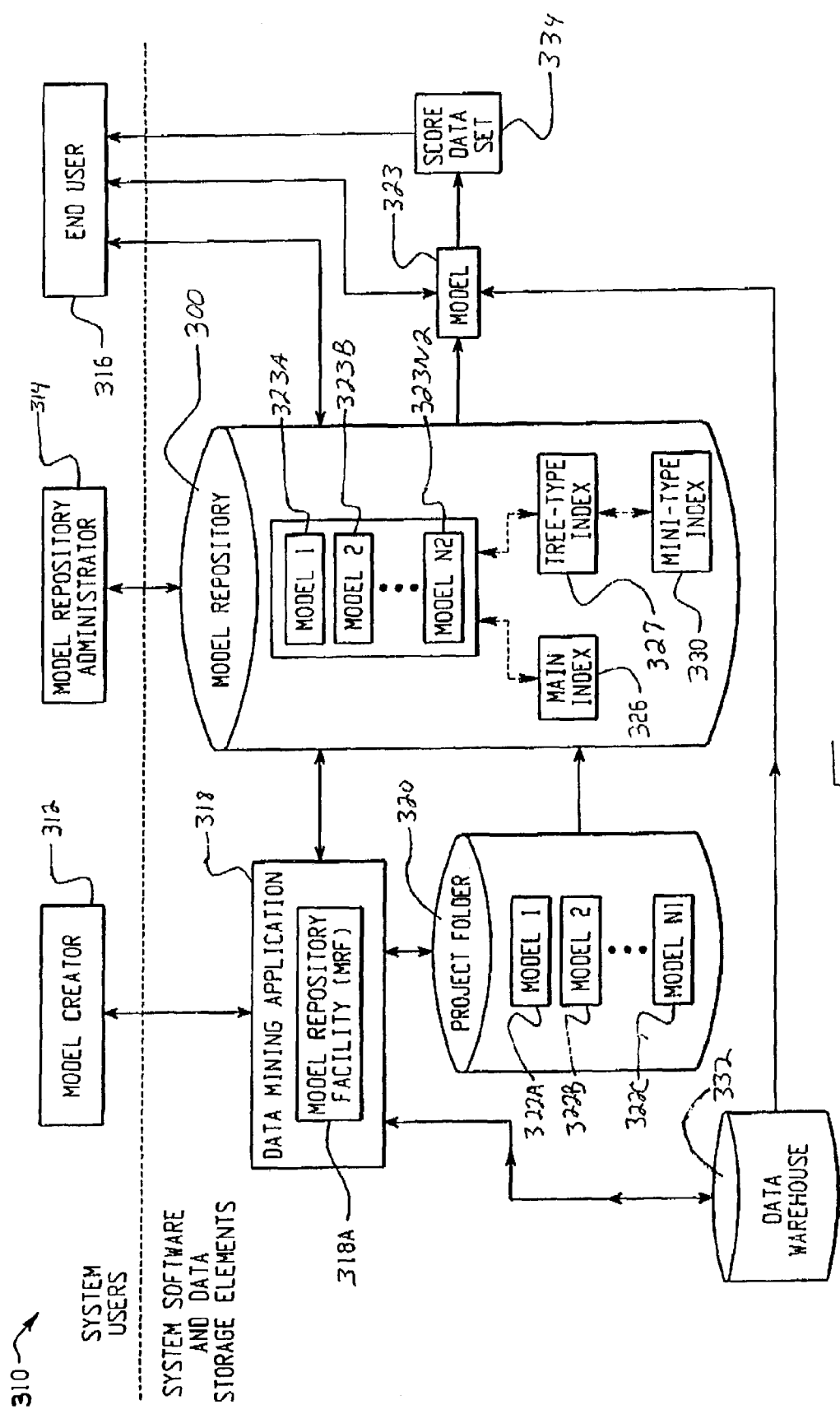
FIG. 8 is a block diagram depicting an example of a model repository operating as a data source for report generation.

It was noted above that many different types of data sources may be used by the ad hoc reporting system. As a further example of this, the reporting system may specify model data contained within a model repository as a data source for use within one or more reports. The model repository is described in reference to FIG. 8. As shown in FIG. 8, diagram 310 depicts a structure of a model repository 300. The model repository 300 may be used with a data mining application 318. The data mining application 318 can search through the large volumes of data stored in the data warehouse 332 and can identify patterns in the data using a variety of pattern-finding algorithms. These patterns are then accessed by the business analyst through the knowledge repository interface system in order to make business recommendations. An example of such a data mining tool is Enterprise Miner™, available from SAS Institute Inc., of Cary, N.C.

The data mining application 318 preferably includes an integrated model repository facility (MRF) 318A to control the export of models to the model repository 300, and the construction or update of one or more model indexes 326, 327, and 330. Alternatively, however, the MRF 318A could be a stand-alone application, in which case it would not be integrated into the data mining application 318.

The data mining application 318 analyzes data records stored in a data warehouse 332, or some other form of data storage facility. In particular, the data mining application 318 includes the decision tree processing module so that models with splitting variables may be generated, where the splitting variables are the variables in the data that best predict the outcome of the transactions. Although a single data warehouse 332 is shown in FIG. 8 for storing the data records, the data analyzed by the data mining application 318 could be spread out among numerous data warehouses 332 or numerous other database systems.

If the decision tree models are saved in the model repository 300, there are one or more dimension indexes (327 and 330) for the models. These indexes (327 and 330) include text representations, graph representations, pointers to model databases, and model level descriptions. These indexes are used to search the model repository for the decision tree models.

As described above, the data mining application 318 is executed using a particular model specification. A model specification typically indicates which input data to analyze from the data warehouse 332, which pattern-finding algorithm (such as a neural network, decision tree, fuzzy logic, etc.) to use for the analysis, how to partition the data, how to assess the results from the analysis, etc.

A data mining model, as generated, is a set of attributes related to a run of a data mining application or another type of statistical-related software application. For example, depending on the algorithm used to create the model, the attributes include the location of the input data, the scoring code, the fit statistics, and so on. However, it should be understood that data mining models can be generated by applications other than a data mining application, such as by a statistical modeling software application.

The models 322A, 322B, 322C that are generated by the data mining application 318 are initially stored in individual project folders 320. For example, each model creator 312 may have his or her own project folder stored in a database of project folders 320. The model creators 312 would then store their own models 322A, 322B, 322C in their individual project folders.

Using the model repository facility 318A, certain useful ones of the generated models 322A, 322B, or 322C can be selected and exported into the model repository 300. These useful models can then be searched for and retrieved manually by end users 316, or programmatically by end user applications 316. The models 323A, 323B, 323N2 stored in the model repository 300 are organized according to a plurality of logical levels, including a project level, a diagram level, and a model level. The project level may include one or more diagrams, each of which describes a particular set of model specifications. Each diagram at the diagram level may then be associated with one or more individual models at the model level.

For each level of the model repository structure, one or more additional descriptive attributes may be associated with the models. The attributes provide descriptive information about the model that can be used to identify a particular model in the model repository 300 via a search and retrieval process. These attributes may be automatically associated with the models by the data mining application 318, or by the model repository facility 318A when the model is exported to the model repository 300. In addition, any of the system users 312, 314, 316 may associate additional attributes with the models. The model attributes may be assigned at the project level, the diagram level, or at the individual model level.

These model attributes are then organized and structured into one or more indexes 326, 327, 330, which are also stored in the model repository 300. These indexes may include a main type index 326, which includes some or all of the attributes for each of the models 323A, 323B and 323N2 in the model repository 300, and/or may include one or more special indexes, such as a tree-type index 327, which includes the attributes for a sub-set of all the models stored in the model repository 300. For example, the tree-type index 327 would include certain attributes of those models that were generated using a decision-tree algorithm. As described above, the decision-tree algorithm generates a type of attribute known as splitting variables, which are stored in the tree-type index 327. Also shown is a mini-index 330, which provides a quick-search capability for the tree-type index 327. These various indexes are used by end users 316, or by end user applications 316, in order to find a particular model, or set of models, within the model repository by executing a search and retrieval operation on the attributes stored in the indexes 326, 327, 330.

A variety of system users can interact with the data mining application 318 and the model repository 300, including a model creator 312 (e.g., a model designer), a model repository administrator 314, and an end user 316. The model creator 312 is the person who operates the data mining application 318 in order to generate a particular model. The model creator 312 determines the specifications for a particular data mining run, generates the corresponding model based on the specification, and then stores the model in his or her individual project folder 320. Alternatively, the model creator 312 could take an existing model from one of the project folders 320, modify the specification in some manner, and then generate a new model. Moreover, because the data in the data warehouse 332 typically changes over time, a model creator 312 can use the same specification against a later version of the data to generate a new model based on the updated data. The model creator 312 may then utilize the MRF 318A to export certain useful models to the model repository 300.

The model repository administrator 314 performs a variety of functions. One of these functions is to control access to the model repository 300. This may include controlling access rights to certain users, such as read access rights and write access rights. In this manner, the model repository administrator 314 can control which users can add or over-write models in the model repository (those having write access) and which users can only read models (those having only read access). The model repository administrator 314 may also control the process of deleting models from the model repository. Control of model deletion is important to ensure that a user with write access does not inadvertently delete a useful model from the model repository 300. In addition, the model repository administrator 314 may also determine which model attributes will be included in the main index 326.

The end user 316 may be a person who is interested in using the models in the model repository 300. The end user 316 could also be a model creator 312, although not all end users will be creating models. The end user 316 accesses the model repository 300 and searches for an appropriate model 323A, 323B, 323N2 by possibly examining the one or more index structures 326, 327, 330. By supplying search parameters and then comparing these search parameters against the attributes stored in the index structures, the end user 316 is able to find one or more useful models. Having found a useful model, the end user 316 may then obtain a copy of the information contained in the model.

The end user 316 may also be an end user application program that programmatically searches for and retrieves an appropriate model from the model repository 300. The end user application program can send a search and/or retrieval request to the model repository 300 over a network, such as a local, wide area, or global (e.g., Internet) network. This search and retrieval capability makes it possible to automate the deployment of models for specific purposes. For example, suppose that part of the operation of an application requires that it find a "best" model (perhaps based on the one with the best assessment results). Or suppose that part of the operation requires the application to choose a model from many similar ones (perhaps based on the one that was most recently generated from certain input data). That part of the operation can be accomplished automatically using the indexes 326, 327, 330 to find the one or more models 323, and then by employing a comparison algorithm (which may be user-specified) to determine which model is most suitable for the particular task. For example, the comparison algorithm could look for the model with the lowest rate of misclassification. The ability to search for a model or models programmatically is particularly important in real-time applications, such as web-based applications, because a person could not find the appropriate model or models fast enough to suit the real-time nature of the task. The selected model 323 then could be used by the end user 316, for example to generate scored data 334.

In addition, with the appropriate access level, an end user 316 could from time to time make a copy of the index(es) 326, 327, 330 and modify them in order to improve performance. Search and retrieval performance on the indexes would be improved because the modified copies would be stored locally to the end user, and because the copies could contain only the rows and columns of the index structure needed for his or her purpose. In this manner, each end user 316 could maintain his or her own index structures for the model repository 300.

Although a single model repository 300 is shown in FIG. 8, this is just one example of a model repository system 310. Alternatively, a particular business enterprise may have more than one model repository 300. In addition, a given model repository 300 may have more than one main-type index 326, or more than one special-type indexes 327, 330. For example, the marketing group of a particular business could have their own main index structure 326 that is based on the model attributes that matter for their purposes, and the sales group could have their own main index structure 326 that is based on other model attributes that matter for their purposes. Although a particular model repository 300 may have more than one special-type index 327, it is preferable that for the particular type of special-type index, such as the tree-type index 327 and mini-index 330, there would be only one of that type of index for each model repository 300. The model repository system is further described in the following pending patent application which is incorporated by reference herein: "Model Repository" with U.S. Ser. No. 09/668,077 filed on Sep. 22, 2000 (Chu et al.).

While examples have been used to disclose the invention, including the best mode, and also to enable any person skilled in the art to make and use the invention, the patentable scope of the invention is defined by the claims, and may include other examples that occur to those skilled in the art. For example, FIGS. 9–25 (located in the U.S. Provisional Patent Application Ser. No. 60/368,896 filed Mar. 29, 2002 entitled "Computer-Implemented System and Method for Report Generation") show an operational scenario for generating reports. As yet another example, additional capabilities may be added such as: the ability to parameterize parts of the report to allow users to be prompted for which values to use (e.g. select years 1999, 2000, 2001); the ability to apply styles (colors, fonts, etc.) based on data conditions (e.g. if a number is less than 1000, make font red and bold); or the ability to create a report with multiple language support.

Figure 9:
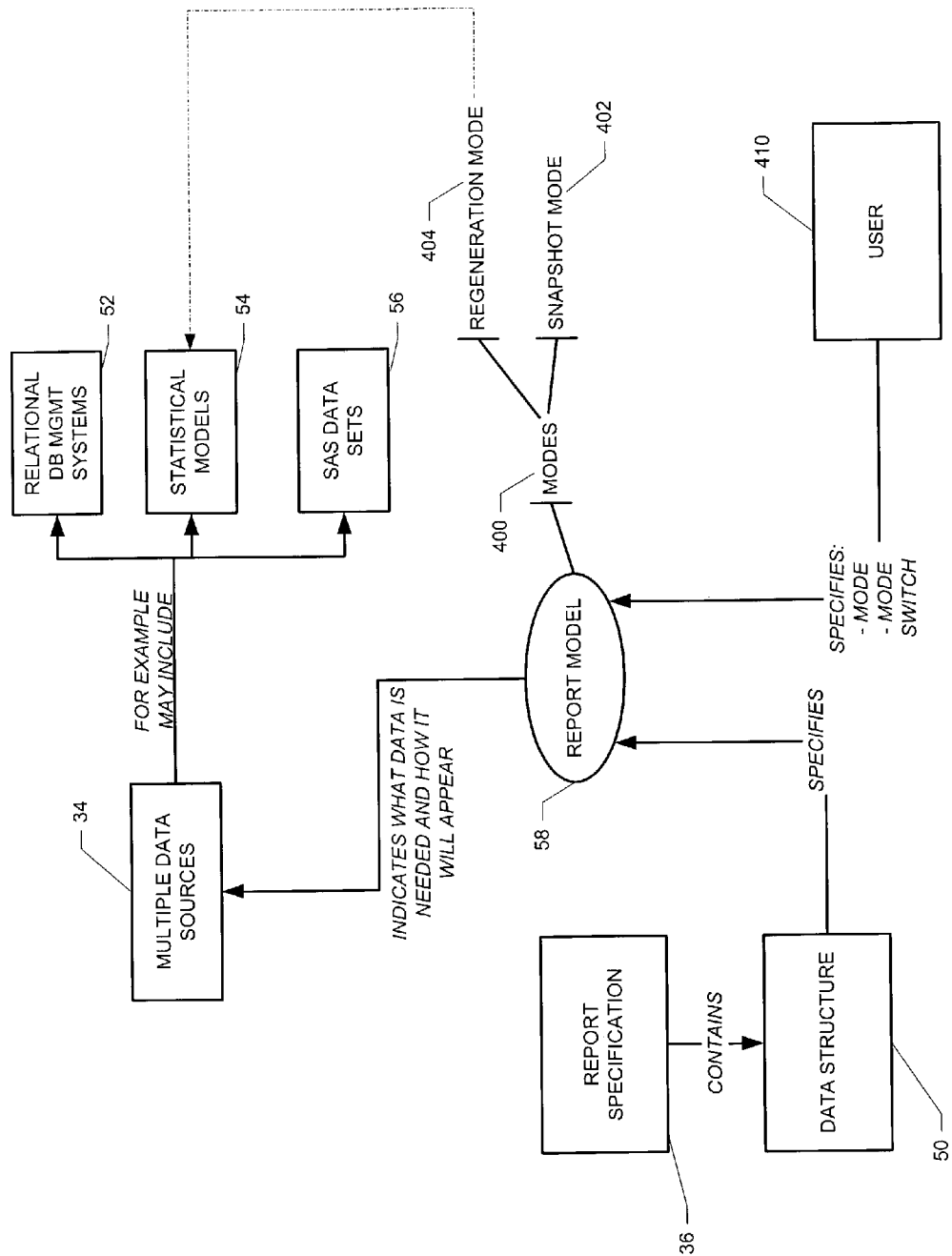
FIGS. 9–11 are block diagrams depicting different operational scenarios in generating reports.

FIG. 9 (shown herein) illustrates a further example of the wide scope of the systems and methods disclosed herein. A report specification 36 may provide a user 410 with the ability to switch among different data acquisition modes 400. As an illustration, a snapshot mode 402 may be specified so that the user 410 can view a snapshot of the data that may have been generated a week ago. In this example if the user 410 wishes to see the latest data, the user 410 switches to the live data mode 404 wherein the remote applications (e.g., statistical models 54) are re-executed in order to regenerate the data using the most current information. The user 410 can then later switch modes 400 to the snapshot mode 402 so that data is not regenerated for the report, but rather uses the snapshot data which can be quickly accessed due to it being locally stored, such as being embedded in the report specification. The user can then later switch back to the live data mode 404. The user 410 may wish to be in different modes 400 for many reasons, such as when the user 410 has time to wait for regeneration of the data.

To indicate which mode 400 is presently selected (either by the user or by default or as automatically determined by a computer system), the data source specification within the report model 58 may contain within its data structure the selected mode. In addition to specifying which mode(s) is(/are) to be used for which data in the report, the data source specification may refer to external data sources 34 (e.g., SAS datasets, OLAP cubes, Oracle relational tables, etc.), as well as contain a snapshot, or copy, of the data from the original data source. This latter data is referred to as "embedded data."

Embedded data allows access to the data when an external data source is not available or able to connect to it or the user 410 does not wish to spend the time regenerating the data. It also supports the ability to have a report on data that is constantly changing. If the data changes the next day, the snapshot of the needed data is maintained within the report to be used for rendering the report rather than reconnecting to the original data source. In addition to supporting references to external data sources 34 and embedded data, the report model 58 also supports having both types in a single report.

Figure 10:
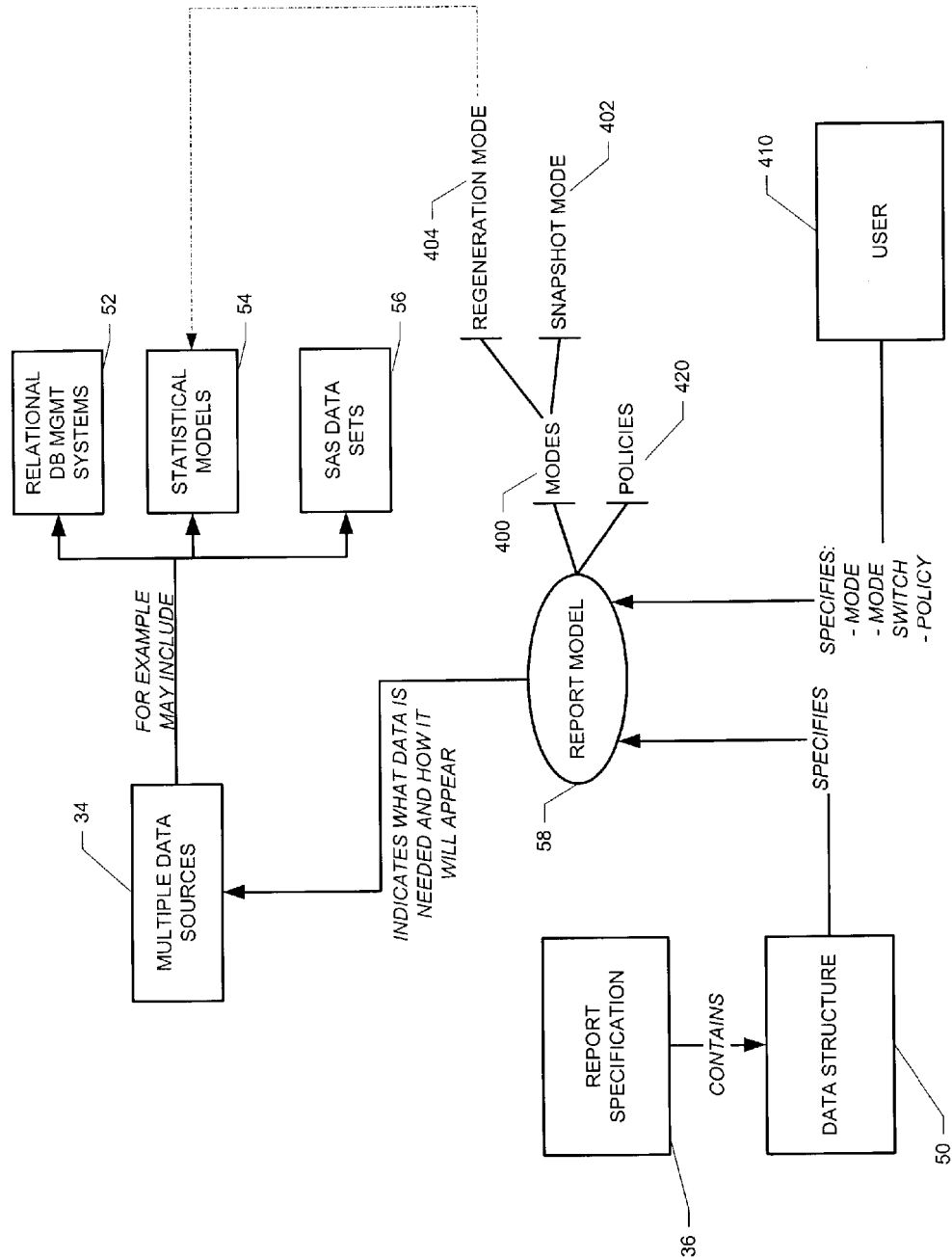

As shown in FIG. 10, data acquisition mode handling may be accomplished through the specification of policies, such as:

STATIC: Render the report with the embedded data. This renders a report with the known data and is also the fastest rendering.

LIVE: Render the report by reconnecting to the data. This gives the freshest data, but it may take longer to connect and retrieve the data again.

FASTEST: Render the report in the fastest manner possible. If within the report there is embedded data only, then embedded data is used to render the report. If within the report there is external data source references only, then the data is retrieved from them to render the report. If both exist within the report, then embedded data is used to render the report because it is typically the fastest to render.

FRESHEST: Render the report in the freshest manner possible. If within the report there is embedded data only, then embedded data is used to render the report. If within the report there is external data source references only, then the data is retrieved from them to render the report. If both exist within the report, then retrieving the data from the external data sources is performed to render the report because that is typically the freshest data.

Figure 11:
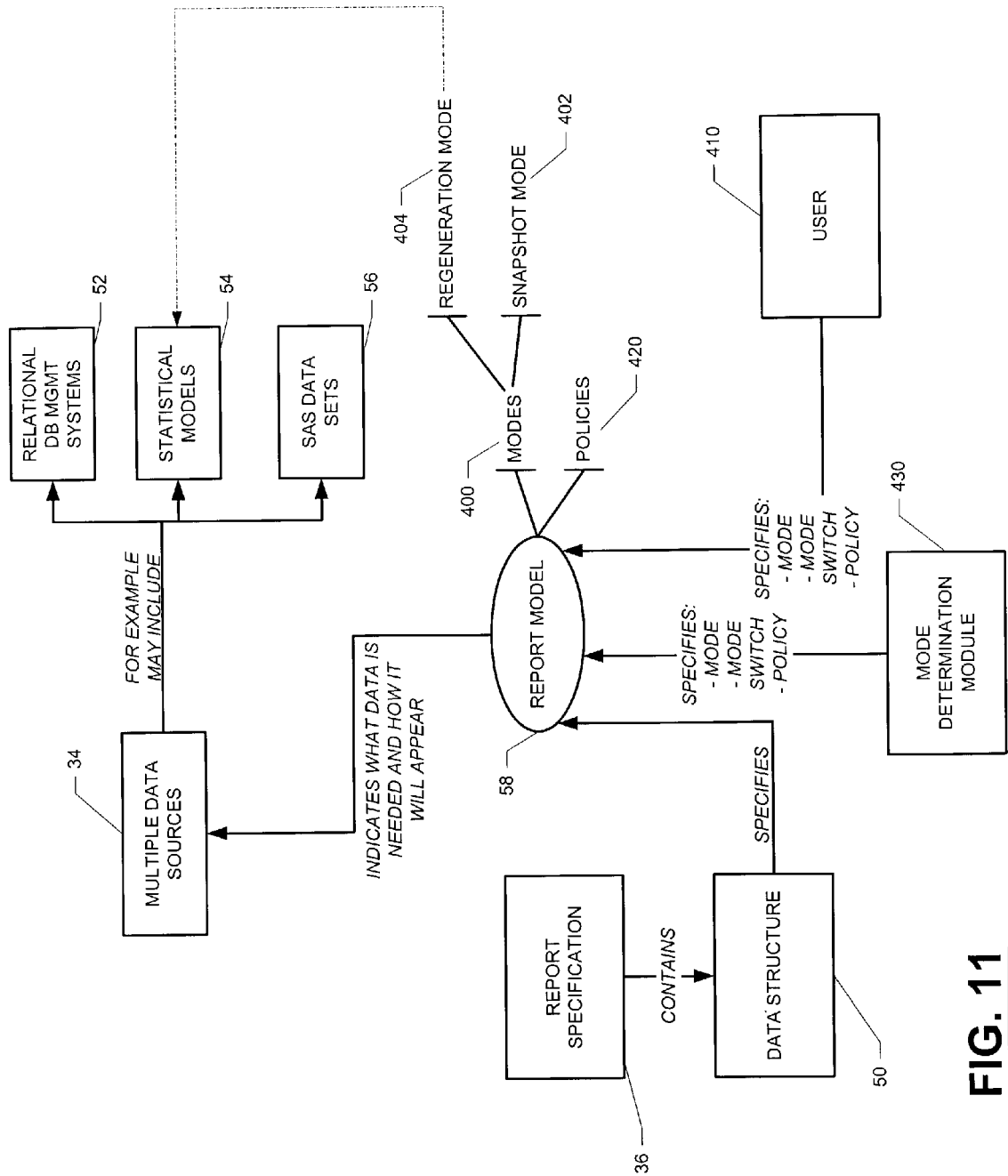

As illustrated in FIG. 11, a computer program 430 may also be used to determine which mode 400 or policy 420 should be used (unless overridden by user selection). The computer program 430 may base its mode and policy determination upon knowing the time and/or resources involved in regenerating the data. For example if the time (or resources) is above a preselected regeneration selection threshold, then the computer program 430 automatically selects a snapshot mode 402 for that particular data. The report model 58 may store the time and resource information for a given data source within its data structures 50. Time or resource information may be acquired by the computer program 430 through configuration information supplied by a human user or it may receive the information from the analytical program that generates the data. The computer program may also determine the information based upon past experience in dealing with generation of the data and/or upon what rights the user has in accessing the external data sources. Still further, the computer program 430 may base its determination upon the category of data involved. As an illustration, if the category represents data that typically does not change often, then the computer program 430 may automatically select the snapshot mode 402 or the static policy.

The computer program 430 may use one or more of such bases (e.g., configuration information, past experience information, category information, etc.) to automatically determine a mode and/or policy. The computer program 430 may determine different modes 400 and policies for different data contained in the report. Moreover, a mode switch (or policy switch) may be effected by the computer program 430, such as: when the computer program 430 determines that the time and resources involved in data regeneration were initially acceptable but the regeneration historical trend data shows that it is no longer acceptable; in such a situation, mode switch to a snapshot mode 402 (or static policy) for that data is justified.

What is claimed is:

1. A computer-implemented system for generating at least one report from a plurality of data sources, comprising:
   a data source specification that indicates the data to be retrieved from the data sources so that a report may be generated based upon the retrieved data, wherein at least two of the data sources are heterogeneous data sources with respect to each other in that one of the data sources supplies its respective data as a data type different than the other data source;
   a view specification that indicates how the data is to be visually represented within the report; and
   a report rendering engine having data access to the data source specification and to the view specification, said report rendering engine causing the data to be retrieved from the data sources in accordance with the data source specification,
   said report rendering engine creating in accordance with the view specification a visual representation of the report based upon the retrieved data.

2. The system of claim 1 wherein the view specification includes a plurality of visual representations within that report that are generated from data retrieved from two heterogeneous data sources.

3. The system of claim 2 wherein the view specification includes visual representations selected from the group consisting of graphs, charts, tabular data, and combinations thereof.

4. The system of claim 1 further comprising:
   a data structure that contains the data source specification and the view specification.

5. The system of claim 4 wherein the data structure is in an eXtensible Markup Language (XML) format.

6. The system of claim 5 wherein the data structure comprises a report model based upon the data source specification and the view specification, said report model being target independent.

7. The system of claim 6 wherein the data structure includes XML tags to indicate data items for the data source specification, said data structure including XML tags to indicate data items for the view specification.

8. The system of claim 1 further comprising:
a styles scheme specification that indicates style information associated with the visual representation of the data within the report.

9. The system of claim 8 further comprising a data structure that contains the data source specification, the view specification, and the styles scheme specification, wherein the data structure is in an eXtensible Markup Language (XML) format, wherein the data structure includes XML tags to contain the data of the data source specification, the view specification, and the styles scheme specification.

10. The system of claim 9 wherein the data structure further comprises template specifications means selected from the group consisting of a table of contents template specifications means, PageHeaders template specification means, PageFooters template specification means, Background images and text template specification means, Overlay images and text template specification means.

11. The system of claim 9 wherein the data structure further comprises a template specification for conditionally rendering sections and elements of the report based on data values.

12. The system of claim 9 wherein the data structure further comprises a template specification for conditionally rendering elements of the document based on the device or target being rendered for.

13. The system of claim 9 wherein the data structure further comprises a template specification for actions to occur when a user clicks on elements in the generated report.

14. The system of claim 1 wherein the view specification indicates the visual representations for a plurality of reports to be generated based upon the retrieved data.

15. The system of claim 1 wherein at least one of the data sources is an OLAP data source.

16. The system of claim 15 wherein at least one of the data sources is a relational data source.

17. The system of claim 16 wherein at least one of the data sources is a software word processing application.

18. The system of claim 16 wherein at least one of the data sources is a software spreadsheet processing application.

19. The system of claim 1 wherein the data sources comprise at least two data sources selected from the group consisting of an OLAP data source, a relational data source, a 4GL (generation language) statistical analysis program data source, a software word processing application, and a software spreadsheet processing application.

20. The system of claim 1 further comprising:
an analytical processing program that generates analytics based upon at least a portion of the retrieved data, said view specification specifying the visual representation of the generated analytics within the report.

21. The system of claim 1 wherein a data change in at least one of the data sources causes an automatic update in the report based upon the data source specification and the view specification.

22. The system of claim 1 wherein said generated report is displayed on a computer-human interface.

23. The system of claim 1 wherein said generated report is printed as a hard copy.

24. The system of claim 1 wherein the data source specification indicates the data is to be retrieved based upon a model stored in a model repository.

25. The system of claim 1 wherein the data source specification indicates the data is to be retrieved based upon a model stored in means for storing models in a model repository.

26. The system of claim 1 wherein the data source specification includes model searching data for use in searching for a model stored in a model repository, wherein the model located from searching the model repository is used to generate data for the report.

27. The system of claim 26 wherein the model searching data includes data for searching model repository index structures.

28. The system of claim 26 wherein the model searching data includes data that is used as a basis for the model repository to select from a plurality of models stored in the model repository.

29. The system of claim 26 wherein the model searching data includes data that is used as a basis for the model repository to select from a plurality of models stored in the model repository, wherein selection of the model is based upon the model most recently generated from input data.

30. The system of claim 1 wherein the report rendering engine prompts the user so that the user may provide parameters to be used in generating the report.

31. The system of claim 1 wherein a style is applied to a part of the report based upon a data condition being satisfied.

32. The system of claim 1 wherein the view specification specifies what human language is to be used in rendering the report.

33. The system of claim 1 wherein the data specified in the data source specification is incorporated into the report based upon a preselected mode.

34. The system of claim 33 wherein the mode is a snapshot mode which indicates that embedded data is to be used in rendering the report.

35. The system of claim 34 wherein the mode is a regeneration mode, wherein the regeneration mode indicates that data specified in the data source specification is to be regenerated.

36. The system of claim 35 wherein switching occurs between the snapshot mode and the regeneration mode, wherein the report is rendered based upon the switched mode.

37. The system of claim 36 wherein a preselected policy specifies which mode is to be used in rendering the report.

38. The system of claim 37 wherein the preselected policy includes a static rendering policy.

39. The system of claim 37 wherein the preselected policy includes a live rendering policy.

40. The system of claim 37 wherein the preselected policy includes a fastest rendering policy.

41. The system of claim 37 wherein the preselected policy includes a freshest rendering policy.

42. The system of claim 36 wherein the data source specification contains the embedded data.

43. The system of claim 36 wherein the embedded data is locally stored.

44. The system of claim 36 wherein the data source specification specifies the mode to be used in rendering the report.

45. The system of claim 36 wherein the report has multiple sections, wherein a report section has an associated mode.

46. The system of claim 45 wherein modes are different for at least two different report sections.

47. The system of claim 36 wherein a user specifies the mode to which the data acquisition should be switched.

48. The system of claim 37 wherein a user specifies the switch to a different mode, wherein the report is rendered based upon the switched mode.

49. The system of claim 36 further comprising a computer program that specifies the mode to which data acquisition should be switched.

50. The system of claim 49 wherein the computer program specifies the switch to a different mode, wherein the report is rendered based upon the switched mode.

51. The system of claim 50 wherein the computer program specifies the mode based upon resources involved in regenerating data for the report.

52. The system of claim 50 wherein the computer program specifies the mode based upon configuration data.

53. The system of claim 50 wherein the computer program specifies the mode based upon category of the data that is to be generated for the report.

54. The system of claim 50 wherein the computer program switches mode based upon historical data involving previous regeneration situations involving the data that is to be generated for the report.

55. A computer-implemented method for generating at least one report from a plurality of data sources, comprising the steps of:

retrieving data from the data sources based upon a data source specification so that so that the report may be generated based upon the retrieved data, wherein at least two of the data sources are heterogeneous data sources with respect to each other in that one of the data sources supplies its respective data as a data type different than the other data source;

determining visual representation characteristics of the data within the report based upon a view specification; and creating in accordance with the view specification a visual representation of the report based upon the retrieved data.

56. A computer-implemented system for generating at least one report from a plurality of data sources, comprising the steps of:

means for retrieving data from the data sources based upon a data source specification so that so that the report may be generated based upon the retrieved data, wherein at least two of the data sources are heterogeneous data sources with respect to each other in that one of the data sources supplies its respective data as a data type different than the other data source;

means for determining visual representation characteristics of the data within the report based upon a view specification; and means for creating in accordance with the view specification a visual representation of the report based upon the retrieved data.

57. The system of claim 56 wherein the view specification includes a plurality of visual representations within that report that are generated from data retrieved from two heterogeneous data sources, said apparatus further comprising data structure means for containing the data source specification and the view specification.

* * * * *

UNITED STATES PATENT AND TRADEMARK OFFICE
CERTIFICATE OF CORRECTION

PATENT NO. : 7,015,911 B2  Page 1 of 1
APPLICATION NO. : 10/403991
DATED : March 21, 2006
INVENTOR(S) : Shaughnessy et al.

It is certified that error appears in the above-identified patent and that said Letters Patent is hereby corrected as shown below:

Column 13,
Line 22, delete "so that" (second occurrence).

Column 14,
Line 8, delete "so that" (second occurence).

Signed and Sealed this

Twentieth Day of June, 2006

JON W. DUDAS
*Director of the United States Patent and Trademark Office*